(12) United States Patent
LaBarge et al.

(10) Patent No.: US 7,093,428 B2
(45) Date of Patent: *Aug. 22, 2006

(54) EXHAUST SYSTEM AND METHOD OF THERMAL MANAGEMENT

(75) Inventors: William J. LaBarge, Bay City, MI (US); Joachim Kupe, Davisburg, MI (US); James Zizelman, Honeoye Falls, NY (US); Jean J. Botti, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/854,623

(22) Filed: May 26, 2004

(65) Prior Publication Data

US 2004/0216451 A1 Nov. 4, 2004

Related U.S. Application Data

(63) Continuation-in-part of application No. 10/301,455, filed on Nov. 21, 2002, now Pat. No. 6,832,473.

(51) Int. Cl.
*F01N 3/00* (2006.01)

(52) U.S. Cl. ............... 60/286; 60/292; 60/297; 60/301; 60/303; 60/311

(58) Field of Classification Search ............... 60/274, 60/275, 285, 286, 287, 292, 295, 297, 301, 60/303, 311, 324
See application file for complete search history.

(56) References Cited

U.S. PATENT DOCUMENTS

| 2,898,202 A | 8/1959 | Houdry et al. |
| 3,370,914 A | 2/1968 | Gross et al. |
| 4,576,617 A | 3/1986 | Renevot ............... 55/96 |
| 5,272,871 A | 12/1993 | Oshima et al. ............... 60/274 |
| 5,322,671 A | 6/1994 | Shustorovich et al. ...... 422/176 |
| 5,406,790 A | 4/1995 | Hirota et al. ............... 60/276 |
| 5,412,946 A | 5/1995 | Oshima et al. ............... 60/286 |
| 5,437,153 A | 8/1995 | Takeshima et al. ......... 60/276 |

(Continued)

FOREIGN PATENT DOCUMENTS

DE 19543219 C1 12/1996

(Continued)

OTHER PUBLICATIONS

Japanese Patent No. JP406117224A; Publication Date: Apr. 26, 1994; Abstract Only (1 page).

*Primary Examiner*—Binh Q. Tran
(74) *Attorney, Agent, or Firm*—Paul L. Marshall

(57) ABSTRACT

An exhaust system can comprise a NOx adsorber, a reformer disposed upstream of a NOx adsorber and in fluid communication with a fuel source, a first valve for controlling the introduction of the fluid to an exhaust conduit; and a particulate filter disposed upstream and in fluid communication with the NOx adsorber and downstream an in fluid communication with the reformer such that the first valve controls introduction of fluid to the exhaust conduit upstream of the particulate filter. The reformer can be designed to generate a fluid comprising sufficient thermal energy, hydrogen, and carbon monoxide. Optionally, the particulate filter can be designed to be regenerated by the thermal energy and to adsorb a sufficient amount of the thermal energy to reduce the temperature of a gas stream comprising the fluid from a first temperature of about 600° C. to about 1,000° C. to a second temperature of less than or equal to about 500° C.

41 Claims, 2 Drawing Sheets

U.S. PATENT DOCUMENTS

| | | | | |
|---|---|---|---|---|
| 5,472,673 | A | 12/1995 | Goto et al. | 422/169 |
| 5,473,890 | A | 12/1995 | Takeshima et al. | 60/285 |
| 5,543,124 | A | 8/1996 | Yokota et al. | 423/239.1 |
| 5,551,231 | A | 9/1996 | Tanaka et al. | 60/289 |
| 5,586,433 | A | 12/1996 | Boegner et al. | 60/274 |
| 5,606,856 | A | 3/1997 | Linder et al. | 60/286 |
| 5,657,625 | A | 8/1997 | Koga et al. | 60/274 |
| 5,711,149 | A | 1/1998 | Araki et al. | 60/278 |
| 5,727,385 | A | 3/1998 | Hepburn | 60/297 |
| 5,746,989 | A | 5/1998 | Murachi et al. | 423/212 R |
| 5,768,888 | A | 6/1998 | Matros et al. | 60/274 |
| 5,850,735 | A | 12/1998 | Araki et al. | 60/274 |
| 5,853,684 | A | 12/1998 | Fang et al. | 423/244.1 |
| 5,894,725 | A | 4/1999 | Cullen et al. | 60/274 |
| 5,921,076 | A | 7/1999 | Krutzsch et al. | 60/274 |
| 6,122,909 | A | 9/2000 | Murphy et al. | 60/286 |
| 6,125,629 | A | 10/2000 | Patchett | 60/286 |
| 6,170,259 | B1 | 1/2001 | Boegner et al. | 60/286 |
| 6,176,078 | B1 | 1/2001 | Balko et al. | 60/274 |
| 6,199,374 | B1 | 3/2001 | Hirota et al. | 60/277 |
| 6,199,375 | B1 | 3/2001 | Russell | 60/286 |
| 6,237,326 | B1 | 5/2001 | Russell | 60/274 |
| 6,247,303 | B1 | 6/2001 | Broer et al. | 60/274 |
| 6,253,543 | B1 | 7/2001 | Russell | 60/274 |
| 6,260,353 | B1 | 7/2001 | Takahashi | 60/286 |
| 6,269,633 | B1 | 8/2001 | van Nieuwstadt et al. | 60/277 |
| 6,272,848 | B1 | 8/2001 | Okude et al. | 60/274 |
| 6,293,094 | B1 | 9/2001 | Schmidt et al. | 60/284 |
| 6,293,096 | B1 | 9/2001 | Khair et al. | 60/286 |
| 6,301,882 | B1 | 10/2001 | Manaka | 60/285 |
| 6,324,834 | B1 | 12/2001 | Schnaibel et al. | 60/274 |
| 6,354,078 | B1 | 3/2002 | Karlsson et al. | 60/274 |
| 6,502,391 | B1 | 1/2003 | Hirota et al. | 60/288 |
| 6,560,958 | B1 | 5/2003 | Bromberg et al. | 60/275 |
| 6,655,130 | B1 | 12/2003 | Kirwan et al. | 60/284 |
| 6,718,753 | B1 * | 4/2004 | Bromberg et al. | 60/275 |
| 6,823,662 | B1 * | 11/2004 | Yamamoto et al. | 60/286 |
| 6,832,473 | B1 * | 12/2004 | Kupe et al. | 60/286 |
| 6,843,054 | B1 * | 1/2005 | Taylor et al. | 60/275 |
| 6,871,790 | B1 | 3/2005 | Kaupert et al. | 237/12.3 |
| 2001/0004832 | A1 | 6/2001 | Hanaki et al. | 60/286 |
| 2001/0039798 | A1 | 11/2001 | Pott | 60/278 |
| 2001/0041153 | A1 | 11/2001 | Benz | 422/169 |
| 2003/0101713 | A1 | 6/2003 | Dalla Betta et al. | 60/284 |
| 2004/0098977 | A1 | 5/2004 | Kupe et al. | 60/286 |
| 2004/0115490 | A1 | 6/2004 | Kaupert et al. | 429/13 |
| 2005/0022450 | A1 | 2/2005 | Tan et al. | 48/198.3 |

FOREIGN PATENT DOCUMENTS

| | | | |
|---|---|---|---|
| DE | 10018792 C1 * | 9/2001 | 60/286 |
| JP | 06117224 A | 4/1994 | |
| JP | 06336914 | 12/1994 | |
| WO | WO 01/14698 A1 | 3/2001 | |
| WO | WO 2004/071646 A2 | 8/2004 | |

* cited by examiner

EXHAUST SYSTEM AND METHOD OF THERMAL MANAGEMENT

CROSS REFERENCE TO RELATED APPLICATION

This application is a continuation-in-part of U.S. patent application Ser. No. 10/301,455 filed Nov. 21, 2002 now U.S. Pat. No. 6,832,473, which is incorporated herein by reference.

BACKGROUND OF THE INVENTION

This disclosure relates to an exhaust system and to thermal energy management and more particularly relates to management of thermal energy flowing into and out of engine exhaust components.

The elimination of hydrocarbons, carbon monoxide, soluble organic fraction, nitric oxide, nitrogen dioxide, nitrous oxide, sulfur oxides, sulfurous oxides, hydrogen sulfide, ammonia and particulates in exhaust gas is a widely addressed problem as a result of environmental concerns and mandated government emissions regulations.

Diesel particulate filters collect particulates from exhaust gas streams. A problem with diesel particulate filters is that they gradually become clogged with particulate matter impeding exhaust flow. The impeded exhaust flow increases pressure back through the exhaust valves into the engine cylinders. This excessive backpressure results in poor engine performance and poor fuel economy. Particulate matter typically consists of carbon, heavy organics, sulfur compounds, nitrogen compounds and phosphorous compounds.

Regeneration of diesel particulate filters occurs when diesel engines emit an exhaust gas stream at a high enough temperature to burn out particulate matter. High temperature exhaust is generated at high engine speeds. However, many passenger diesel vehicles are operated for protracted periods of time at, or close to, idling speed. At idle speed the exhaust gas stream is below the combustion temperature of particulate matter.

Passive diesel particulate filters are used in heavy duty applications that generate enough exhaust temperature for effective regeneration. However passive diesel systems regenerate particulate traps, but do little for $NO_x$ reduction. Further, while passive diesel particulate traps effectively remove coarse particulates, the nano-phase particulates are greatly increased when a passive regeneration is used. An effective active regeneration method is greatly desired. Especially for acceptance of lean burn passenger vehicles.

The doping of diesel fuels with diesel combustion aids is an effective active regeneration method for small passenger vehicles. The combustion additive lowers engine out particulates then collects as an oxide on the particulate trap. Further, the collected oxide aids in the combustion of trapped particulates at lower temperatures. However, particulate oxides cannot pass through the particulate trap. And the particulate oxides are rapidly poisoned by engine oil deposits and become "vitrified". Eventually, at relatively low hours of engine use, the particulate trap has to be physically removed and vitrified particulate oxides removed. Stricter emission standards make particulate trap cleaning during the useful life of a vehicle undesirable if not unacceptable.

The most common particulate trap and catalyst deactivation occurs because vaporized engine oils decompose and form diffusion limiting glass coatings. For example, most engine oil contains zinc dialkyl phosphate and calcium phosphate. The materials form the glass zinc calcium phosphate over particulate traps, catalysts and sensors. Eventually particulate traps cannot be regenerated because the glass layer cannot be vaporized.

What is needed in the art is a system and method for the regeneration of particulate traps that does not adversely affect a NOx adsorber disposed downstream of the particulate trap.

SUMMARY OF THE INVENTION

Disclosed herein are exhaust systems and methods for operating exhaust systems. An exhaust system can comprise a NOx adsorber, a reformer disposed upstream of a NOx adsorber and in fluid communication with a fuel source, a first valve for controlling the introduction of the fluid to an exhaust conduit; and a particulate filter disposed upstream and in fluid communication with the NOx adsorber and downstream an in fluid communication with the reformer such that the first valve controls introduction of fluid to the exhaust conduit upstream of the particulate filter. The reformer can be designed to generate a fluid comprising sufficient thermal energy, hydrogen, and carbon monoxide. Optionally, the particulate filter can be designed to be regenerated by the thermal energy and to adsorb a sufficient amount of the thermal energy to reduce the temperature of a gas stream comprising the fluid from a first temperature of about 600° C. to about 1,000° C. to a second temperature of less than or equal to about 500° C.

In one embodiment, the method for operating the exhaust system, comprises: generating a gas stream comprising NOx and particulate; passing the gas stream through a particulate filter and then through a NOx adsorber, wherein, during a storage phase, the particulate filter removes the particulate from the gas stream and the NOx adsorber adsorbs the NOx on an acid adsorber; and regenerating. Regenerating comprises: generating a fluid comprising thermal energy, hydrogen, and carbon monoxide from a fuel, introducing the fluid to a gas stream to form a heated stream, introducing the heated stream to the particulate filter, regenerating the particulate filter, reducing the temperature of the heated stream to form a particulate effluent, introducing the particulate effluent to a NOx adsorber, wherein the hydrogen reacts with adsorbed NOx to form NHx, adsorbing the NHx on a base adsorber in the NOx adsorber, and forming an adsorber effluent.

In another embodiment, the method for operating an exhaust system, comprises: generating a gas stream comprising NOx and particulates; passing the gas stream through a particulate filter, then through a phosphate, and then through a NOx adsorber, wherein, during a storage phase, the particulate filter removes the particulates from the gas stream and the NOx adsorber adsorbs the NOx on an acid adsorber; and regenerating. Regenerating comprises: generating a fluid comprising thermal energy, hydrogen, and carbon monoxide from a fuel; introducing the fluid to a gas stream to form a heated stream having a temperature of about 700° C. to about 1,000° C.; introducing the heated stream to a first oxidation catalyst; introducing the heated stream to the particulate filter, wherein the heated stream has a temperature of greater than or equal to 700° C. when it enters the particulate filter; regenerating the particulate filter; reducing the temperature of the heated stream to form a particulate effluent having a temperature of less than or equal to about 700° C.; introducing the particulate effluent to the phosphate trap; adsorbing vapor phase glass formers in the phosphate trap to form a trap effluent; introducing the trap effluent to the NOx adsorber, wherein the trap effluent has a temperature of about 300° C. to 500° C. when entering the NOx adsorber, and wherein the hydrogen reacts with adsorbed NOx to form NHx; adsorbing the NHx on a base adsorber in the NOx adsorber and forming an adsorber effluent; and introducing the adsorber effluent to a second oxidation catalyst, wherein the adsorber effluent has a temperature of about 200° C. to about 350° C. when entering the second oxidation catalyst.

The above-described and other features will be appreciated and understood by those skilled in the art from the following detailed description, drawings, and appended claims.

BRIEF DESCRIPTION OF THE DRAWINGS

Refer now to the figures, which are exemplary embodiments and wherein like elements are numbered alike.

DESCRIPTION OF THE PREFERRED EMBODIMENT

Figure 1:
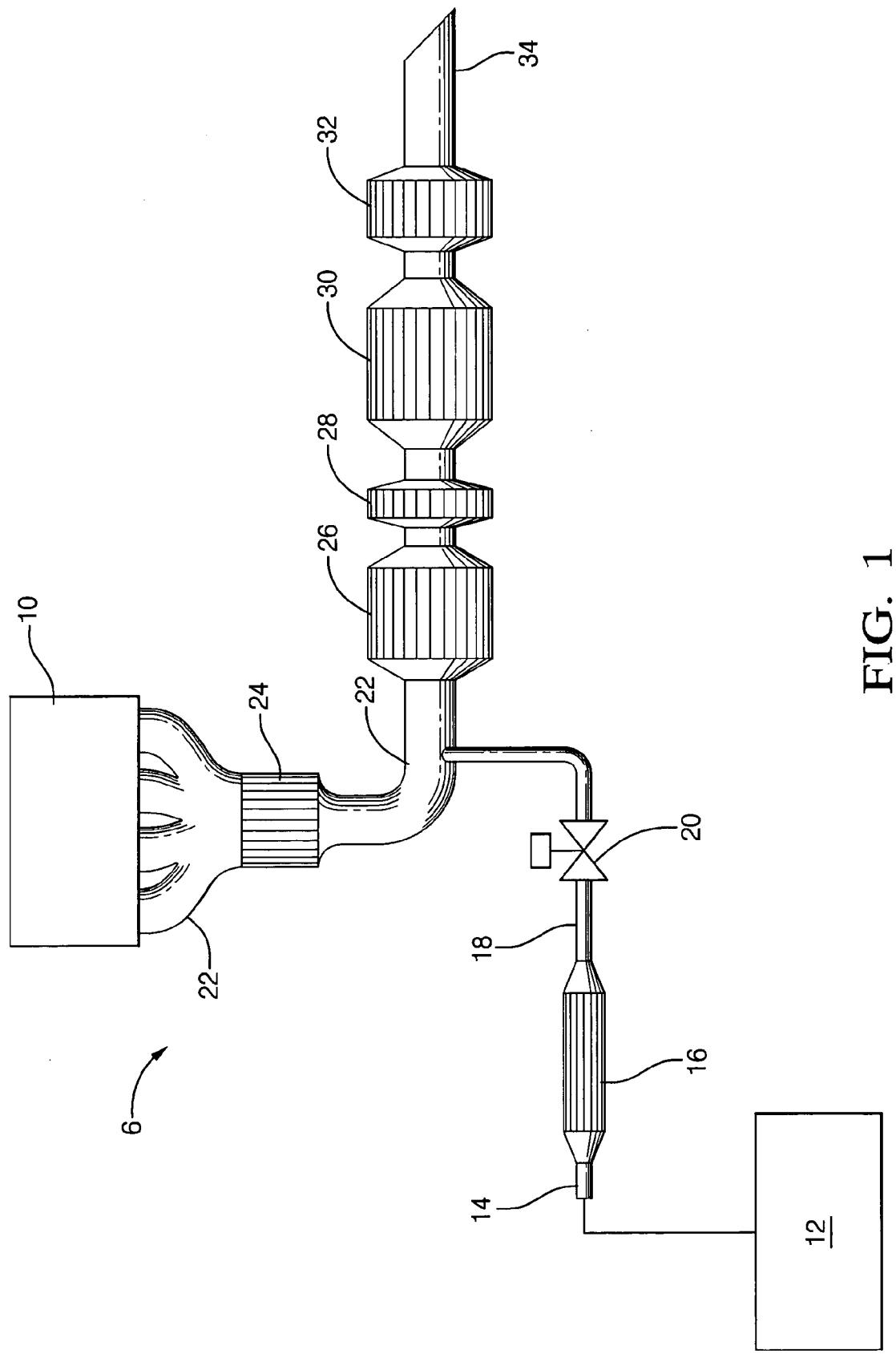
FIG. 1 is a schematic view of a system for regenerating a particulate trap, NOx adsorber and a second oxidation catalyst of a lean burn vehicle.

It is noted that the terms "first," "second," and the like, herein do not denote any quantity, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to about 25 wt %, with about 5 wt % to about 20 wt % desired," are inclusive of the endpoints and all intermediate values of the ranges of "about 5 wt % to about 25 wt %," etc.).

This disclosure relates generally to a thermal management method and a reducing agent method for efficient reduction of lean exhaust emissions and efficient regeneration of lean exhaust emission components. Relatively cold exhaust temperatures and very little reducing agent characterize engines that produce lean exhaust. By itself, addition of thermal energy to the exhaust stream increases sulfate particulates, sulfur poisoning and $NO_x$ emissions. By itself, addition of hydrogen increases soluble organic fraction, ammonia, hydrogen sulfide, sulfurous, carbon monoxide emissions and phosphate poisoning. The combination of thermal energy and hydrogen provide efficient reduction of emissions, regeneration of exhaust components, and reduction of phosphate poisoning.

The present thermal energy management system and method for controlling the thermal energy flow into and out of an exhaust system can comprise a reformer, an oxidation catalyst, a particulate trap, a phosphate trap, a $NO_x$ adsorber, and/or a second oxidation catalyst. The particulate trap controls thermal energy flow into the $NO_x$ trap and second oxidation catalyst. The system further provides management of the temperature distribution around the particulate trap to meet outer skin temperature design targets and to control the inlet gas temperatures of the $NO_x$ trap and second oxidation catalyst.

The reformer system comprises an air pump and valve means for selectively controlling and directing hydrogen and carbon monoxide and/or air containing fluid from the reformer to the particulate trap, the phosphate trap, the $NO_x$ adsorber and the oxidation catalyst. Reformer generates a high temperature hydrogen-rich gas from the fuel source. The hydrogen rich gas includes hydrogen, carbon monoxide, carbon dioxide, one carbon species, 2 carbon species, 3 carbon species, products and water. Reformer may be configured for partial oxidation, steam reforming, and/or dry reforming. Preferably, the reformer is configured for partial oxidation that is capable of reforming a fuel such that greater than or equal to about 90 mole % of the total reformed stream is a mixture of hydrogen and carbon monoxide.

Partial oxidation reformers are based on sub-stoichiometric combustion to achieve the temperatures necessary to reform hydrocarbon fuel. Decomposition of fuel to primarily hydrogen and carbon monoxide occurs through thermal reactions at temperatures of about 800° C. to about 1,200° C. The partial oxidation reactions are exothermic and no fuel consumption is needed to supply the thermal energy. The use of partial oxidation catalysts can result in acceleration of the reforming reactions and can provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2 + \text{heat} \qquad (I)$$

In contrast, steam configured reformers react fuel and steam ($H_2O$) in heated tubes filled with catalysts to convert hydrocarbons in the fuel into primarily hydrogen and carbon monoxide. An example of the steam reforming reaction is as follows:

$$CH_4 + H_2O \rightarrow CO + 4H_2 \qquad (II)$$

Dry reforming systems form hydrogen and carbon monoxide in the absence of water, for example, by using carbon dioxide. An example of the dry reforming reaction is depicted in the following reaction:

$$CH_4 + CO_2 \rightarrow 2CO + 2H_2 \qquad (III)$$

Reformer preferably comprises precious metals supported upon high surface area materials disposed on a substrate. The precious metals can be washcoated, imbibed, impregnated, physisorbed, chemisorbed, precipitated, or otherwise applied to the high surface area support. Possible precious metal materials include rhodium, platinum, palladium, ruthenium, iridium, and the like, and oxides, mixtures, and alloys comprising at least one of the foregoing metals. Where the catalytic metal component is a combination of rhodium with one or more other metals, the other metals, e.g., platinum, and the like, are typically present in an amount less than the rhodium. More particularly, with a platinum-rhodium combination, the catalytic metal component can comprise less than or equal to about 95 atomic percent (at %) rhodium and less than or equal to about 30 at % platinum; with about 70 at % to about 85 at % rhodium and about 2.5 at % to about 20 at % platinum preferred; and about 70 at % to about 80 at % rhodium and about 5 at % to about 10 at % platinum especially preferred, based on the total atoms of the precious metal.

High surface area reformer support materials that can be used include hexaalluminogallates, alluminogallates, hexaaluminates, aluminum oxidetes, zirconium toughened aluminum oxide, titanium toughened aluminum oxide, aluminum oxide, as well as mixtures comprising at least one of the foregoing materials, with hexaaluminates and hexaalluminogallates preferred.

The reformer substrate that the high surface area materials are supported upon is preferably capable of operating at temperatures up to about 1,400° C.; capable of withstanding reducing environments in the presence of water, oxidizing environments, water, alcohols, hydrocarbons, hydrogen, carbon monoxide, oxygen, sulfur oxides, sulfur-containing compounds, combustion radicals, hydroxyl ions, and the like, and have structural integrity to withstand up to about 50,000 thermal cycles. Materials that can be used as the reformer substrate include, zirconium toughened aluminum oxide, titanium toughened aluminum oxide, aluminum oxide, zirconium oxide, titanium oxide, as well as oxides, alloys, cermets, and the like, as well as combinations comprising at least one of the foregoing materials. Preferred materials for the reformer substrate are aluminum oxide, zirconium oxide, and combinations comprising aluminum oxide and zirconium oxide.

Additionally, although the reformer substrate can have any size or geometry, the size and geometry are preferably chosen to optimize the flow distribution through the substrate. The preferred reformer substrate preferably has a cell foam structure. The substrate is formed into a porous cell structure using ceramic slurry over a fugitive polymer and burnout of the fugitive and the like. Alternatively, the substrate can be extruded honeycomb cell geometry, with the cells being any multi-sided or rounded shape, with substantially square, hexagonal, octagonal or similar geometries preferred due to increased surface area and structural integrity. The substrate is formed into a cell structure with a plurality of cells arranged in a honeycomb pattern using an extrusion process, and the like.

The reformer substrate(s) (as with the oxidation catalysts, particulate trap, phosphate trap, and NOx adsorber discussed in detail below) is surrounded by an insulation material and housed in a metal shell. Desirably, the insulation material substantially covers the sides of the substrate, and the shell substantially covers the insulation material. The insulation material comprises materials such as aluminum oxide fibers, intumescent materials, ceramic mats, and/or mica based materials, including combinations comprising at least one of the foregoing insulation materials, and the like. Possible materials for the shell include ferrous materials, such as ferritic stainless steels. Ferritic stainless steels include stainless steels such as the 400-Series, for example, SS-409, SS-439, and SS-441, and alloys, and combinations comprising at least one of the foregoing stainless steels, with grade SS-409 generally preferred.

The reformer can generate various amounts of thermal energy and products. If for example, more thermal energy is desired, the amount of oxygen, fuel and flow rate through the reformer can be adjusted in a combination that allows more exothermic combustion of fuel to occur. The reformer is directly (physically) attached to the diesel exhaust manifold. The reformer can be operated as an air pump when not in reforming mode. The excess oxygen and thermal energy from the exhaust manifold can be used to combust any soot accumulated on the reformer.

In fluid communication with the reformer is a fuel source, wherein the reformer is adapted to generate a hydrogen and carbon monoxide containing fluid from a fuel supplied by the fuel source. The fuel source preferably includes hydrocarbon fuels, including, but not limited to, liquid fuels, such as rape methyl ester, diesel, diesel-water emulsion, diesel-ethanol, gasoline, ethanol, methanol, kerosene, and alternative fuels, such as biodiesel, bioethanol, dimethyl ether, and others; and mixtures of at least one of the foregoing fuels. The selection of fuel source is based upon ability to be used in a compression ignition engine, application, expense, availability, and environmental issues relating to fuel source.

Optionally disposed downstream of the reformer, between the reformer and the particulate trap, can be an oxidation catalyst. The oxidation catalyst preferably comprises precious metals supported upon high surface area materials supported on a substrate. Possible precious metal materials include platinum, palladium, ruthenium, iridium, rhodium, gold, silver and the like, and oxides, mixtures, and alloys comprising at least one of the foregoing metals. The precious metals can be washcoated, imbibed, impregnated, physisorbed, chemisorbed, precipitated, or otherwise applied to the high surface area support. Where the catalytic metal component is a combination of platinum with one or more other metals, the other metals, e.g., ruthenium, and the like, are typically present in an amount less than the platinum. More particularly, with a platinum-ruthenium combination, the catalytic metal component can comprise less than or equal to about 95 at % platinum and less than or equal to about 50 at % ruthenium; with about 60 at % to about 90 at % platinum and about 10 at % to about 40 at % ruthenium preferred; and about 60 at % to about 70 at % platinum and about 30 at % to about 40 at % ruthenium more preferred, based on the total atoms of precious metals.

High surface area oxidation catalyst support materials that can be used include zirconium titanium solid solutions, zirconium titanium aluminum solid solutions, zirconium titanium oxides, titanium oxides, zirconium oxides, aluminum oxides, zirconium toughened aluminum oxide, titanium toughened aluminum oxide, as well as mixtures comprising at least one of the foregoing materials, with zirconium titanium solid solutions and zirconium titanium aluminum solid solutions greatly preferred.

The oxidation catalyst substrate that the high surface area materials are supported upon is preferably capable of operating at temperatures up to about 1,400° C. Although the oxidation catalyst substrate can have any size or geometry, the size and geometry are preferably chosen to optimize the flow distribution through the substrate. The substrate can be an extruded honeycomb cell geometry, with the cells being any multi-sided or rounded shape, with substantially square, hexagonal, octagonal or similar geometries preferred due to increased surface area and structural integrity. The substrate is formed into a cell structure with a plurality of cells arranged in a honeycomb pattern using an extrusion process, or the like.

Downstream of the reformer and the optional oxidation catalyst is the particulate trap. The particulate trap is desirably designed to adsorb the thermal energy (generated in the reformer) to avoid reduction of the $NO_x$ activity of the NOx adsorber; e.g., the substrate of the particulate trap has sufficient thermal mass to adsorb the thermal energy from the gas stream to reduce the temperature of the gas stream from an initial temperature of about 700° C. to about 1,200° C. down to a temperature of less than or equal to about 500° C. (e.g., about 300° C. to about 450° C., with a reduced temperature of about 300° C. to about 400° C. preferred). The size of the particulate trap is designed such that the surface area is large enough to dissipate the energy resulting from the exothermic reaction. The energy dissipation is such that the particulate trap will not require additional heat input to regenerate the trap. The reducing agents pass through the particulate trap.

The particulate trap comprises a wall flow monolithic substrate made from a ceramic, metallic, carbide, silicides, and nitrides, and the like, or composite material, and the like, and combinations comprising at least one of the foregoing materials. Silicon carbide or stainless steel (e.g., extruded stainless steel) are preferred in the present system because of the high thermally conductivity that allows the regeneration of the particulate trap while reducing the temperature sufficiently to inhibit adverse effects on the NOx adsorber. Such materials preferably possess a sufficient porosity to permit passage of exhaust and reformate through the monolith walls, and yet filter out a substantial portion, if not all of the particulate matter present in the exhaust. Additionally the filter element includes a fibrous coating material such that soot particulates cannot pack densely. In the present system, the particulate trap element may be uncatalyzed; e.g., does not include any catalyst or washcoat material.

Optionally, the particulate trap can comprise multiple particulate traps with the first particulate trap having a lower catalyst concentration (e.g., uncatalyzed) than the second particulate trap. The particulate trap element may comprise two or more individual elements. Preferably the individual elements may comprise different precious metal concentrations. For example, the first element may be primarily coated with a perovskite having a low precious metal content while a second filtering element downstream of the first element, may have a higher precious metal concentration on a support (such as cerium). Additionally the filter element may include a fibrous coating material such that soot particulates cannot pack densely.

Downstream of the particulate trap is the NOx adsorber with an optional phosphate trap disposed therebetween. The phosphate trap has a high affinity for the volatile phosphates species. Thermal energy, hydrogen and water vaporize the "glass" phosphate phase from the particulate trap. Vaporized amorphous compounds such as "glassy" calcium phosphate are adsorbed so that they can not damage to the NOx adsorber. Phosphate trap preferably comprises no precious metals. Phosphate trap preferably contains only high surface area materials supported on a substrate. High surface area materials (e.g., surface areas of greater than or equal to about 90 meters squared per gram ($m^2/g$)) that can be used include zeolites, high surface area aluminum oxide, zirconium toughened aluminum oxide, titanium toughened aluminum oxide, aluminum oxide, as well as mixtures comprising at least one of the foregoing materials, with high surface area zeolites greatly preferred. The phosphate trap substrate that the high surface area materials are supported upon is preferably high cell density cordierite. Although the substrate can have any size or geometry, the size and geometry are preferably extruded cordierite with 600 cell honeycomb cell geometry, or greater with the cells being any multi-sided or rounded shape, with substantially square, hexagonal, octagonal or similar geometries preferred due to increased surface area and structural integrity.

Disposed downstream of the particulate trap is the NOx adsorber for adsorbing NOx from the gas stream. After an adsorption period, the adsorber will need to be regenerated using a reducing agent. When hydrogen is used as a reducing agent, diatomic nitrogen formation does not occur. Instead ammonia reacts with water forming ammonium hydroxide ($NH_4OH$) a very strong base. Neither ammonia nor ammonium hydroxide has chemical affinity for the acid adsorbing support. Ammonia and ammonium hydroxide desorb from the acid adsorber before conversion to $N_2$ can be accomplished. Further, the hydrogen sulfide and hydrogen phosphate species also have no chemical affinity for the acid adsorbing support. Therefore, the $NO_x$ adsorber is preferably an acid/base $NO_x$ adsorber. The acid/base $NO_x$ adsorber comprises an acid adsorber and a base adsorber, e.g., "$NO_x$" and "$SO_x$" being adsorbed on an acid adsorber and "$NH_x$" and "$SH_x$" being adsorbed on a base adsorber. For example, precious metal converts essentially all $NO_x$ species to nitrogen dioxide ($NO_2$). Nitrogen dioxide in the presence of water ($H_2O$) forms, in situ, nitrous acid ($HNO_3$), a very strong acid. Barium oxide in the presence of water forms, in situ, barium hydroxide $Ba(OH)_2$, a very strong base. The strong base adsorbs acids such as "$NO_x$", "$SO_x$" and "$PO_x$" fractions.

For example, the acid/base $NO_x$ adsorber comprises, for example, a cordierite "cell" then a layer of acid adsorber then a layer of base adsorber. The exhaust gas species passes first through the base adsorber layer and then into the acid adsorber formulation. NOx and SOx species pass through base adsorber without being adsorbed. The $NO_x$ and SOx species reach the acid adsorber and are trapped on the acid adsorber. After some time a reformer is turned on and a hydrogen pulse sent through the exhaust. The hydrogen passes through the base adsorber layer without being adsorbed. The hydrogen reaches the acid adsorber and quickly reacts with the stored "$NO_x$" and "$SO_x$" producing "$NH_x$" and "$SH_x$" chemically reduced species. The species "$NH_x$" and "$SH_x$" are strong bases and have no affinity for the acid adsorber. The "$NH_x$" and "$SH_x$" species travel upwards towards the exhaust and are trapped upon the base adsorber top layer for the duration of the hydrogen pulse. The hydrogen pulse ends and the exhaust steam returns to oxidizing conditions. Just created $NO_x$ and $SO_x$ species reach the base adsorber and react vigorously with the stored "$NH_x$" and "$SH_x$". Diatomic nitrogen is rapidly formed along with water and thermal energy. The $SO_x$ species are chemically reduced to $SO_2$ and released as $SO_2$ to the exhaust stream. The "$NO_x$" and "$SO_x$" species chemically oxidize "$SH_x$" to $SO_2$ and released as $SO_2$ to the exhaust stream.

The acid adsorber comprises a precious metal component and comprises a zirconium component as a solid solution or complex oxide with at least one alkali element or alkaline earth metal component. The alkali element or alkaline earth metal components are only present as solid solutions or complex oxides with the zirconium oxide, for example as $Ba_{0.15}Zr_{0.85}O_2$ solid solution and not as barium oxide supported upon zirconium oxide as for example $BaO/ZrO_2$. The alkali element or alkaline earth metal components can comprise alkali elements, alkaline earth metals, their oxides, alloys and combinations comprising one or more of the foregoing components. Suitable alkali elements and alkaline earth metals include, for example, barium, lithium, calcium, rubidium, potassium, magnesium, sodium, cesium, strontium, and combinations comprising one or more of the foregoing components, with divalent alkali elements preferred over monovalent alkali elements.

The acid adsorber precious metal components are in association with the zirconium oxide and alkali element or alkaline earth metal components. The precious metal component can comprise a precious metal, oxide, alloy or combination comprising one or more of the foregoing precious metal components. Suitable precious metals include, for example, rhodium, platinum, palladium, ruthenium, iridium and the like, and combinations comprising one or more of the foregoing precious metals. For example platinum supported upon a barium-zirconium solid solution, i.e., the catalyst is $Pt/Ba_{0.15}Zr0_{0.85}O_2$; and is not a palladium-barium-zirconium solid solution (i.e., $Pt_{0.02}Ba_{0.15}Zr_{0.83}O2$) and is not palladium oxide and barium oxide supported upon zirconium oxide, i.e. $Pt/BaO/ZrO_2$.

The zirconium component of the acid adsorber component can comprise, for example, less than or equal to about 90 mole percent (mol %) of that layer, based on the total weight of the acid adsorber layer, with about 50 mol. % to about 85 mol. % preferred, and about 60 mol. % to about 80 mol. % more preferred. The remaining mol. % of the acid adsorber layer may comprise trivalent, high surface area, support materials such as aluminum oxides (e.g., gamma-alumina, theta-alumina, delta-alumina), scandium oxides, gallium oxides, aluminates, as well as combinations comprising one or more of the foregoing materials. These materials are added to the zirconium component to enhance the thermal resistance of the catalysts. For example an acid adsorber layer comprising about 75 mol. % to about 85 mol. % Pt/$Ba_{0.15}Zr_{0.85}O_2$ solid solution, and about 15 mol. % to about 25 mol % $La_x(Al_2O_3)_{1-x}$ gamma-delta aluminum oxide is preferred.

Also, the zirconium component can comprise, for example, less than or equal to about 98 mol. % zirconium oxide, based on the total mol. % of the zirconium component of the acid adsorbing layer, specifically, about 68 mol. % to about 96 mol. % zirconium oxide can be used, and more specifically about 87 mol. % to about 91 mol. % zirconium oxide, e.g., $Ba_{0.15}Zr_{0.85}O_2$.

The alkali element and/or alkaline earth metal component can be employed at an amount of less than or equal to about 28 mol. %, based on the total moles of the zirconium component portion of the acid adsorber layer, specifically, about 4 mol. % to about 28 mol. % alkali element and/or alkaline earth metal component, more specifically about 8 mol. % to about 22 mol % alkali element or alkaline earth metal component, and even more specifically about 8 mol. % to about 16 mol %, for example $Ba_{0.15}Zr_{0.85}O_2$.

The acid adsorber precious metal component can be employed in an amount of about 0.05 wt % to about 4 wt %, based on the total weight of the acid adsorbing layer, specifically about 0.4 wt % to about 3 wt %, more specifically about 0.75 wt % to about 2 wt %. When the acid adsorber precious metal component can comprises platinum in combination with a second acid adsorber precious metal component, it is preferred that the amount of the second acid adsorber precious metal (based upon the total amount of precious metal in the acid absorber layer), is less than the amount of platinum. The acid adsorber precious metal component can comprise, for example, less than or equal to about 99 mol. % platinum and less than or equal to about 50 mol. % rhodium, based on the total moles of precious metal in the acid adsorber layer. Specifically, the acid adsorber precious metal may comprise about 80 mol. % to about 99 mol. % platinum, more specifically about 90 mol. % to about 99 mol. % platinum. The acid adsorber precious metal may also comprise about 1 mol. % to about 50 mol. % rhodium, specifically about 5 mol. % to about 10 mol. % rhodium. For example an acid adsorber layer can comprise 1.2 wt % post impregnated precious metal loading deposited upon a barium-zirconium solid solution is represented as 1.2 wt % $Pt_{0.93}Rh_{0.07}/Ba_{0.15}Zr_{0.85}O_2$.

The base adsorber layer is a zirconium solid solution comprising a zirconium component, a transition metal oxide component, and a precious metal component. Suitable transition metal oxides for forming solid solutions with zirconium oxide include, for example, tungsten oxides, vanadium oxides, niobium oxides, rhenium oxide, molybdenum oxides, nickel oxides, and combinations comprising one or more of the foregoing transition metal oxides, with the variable valence of tungsten and molybdenum preferred. Suitable precious metal components comprise those precious metal components described previously for the acid adsorber layer.

The zirconium component can comprise, for example, less than or equal to about 99.95 mol. % of zirconium oxide based on the total moles of the base adsorber layer. Specifically, about 72 mol. % to about 92 mol. % zirconium oxide can be employed, more specifically, about 76 mol. % to about 86 mol. %. For example the solid solution can comprise $W_xZr_{1-x}O_2$, e.g., $W_{0.03}Zr_{0.97}O_2$ and/or $WO_{0.19}Zr_{0.81}O_2$.

The transition metal oxide component can be employed in the solid solution at less than or equal to about 32 mol. %, based on the total moles of the zirconium solid solution in the base adsorber layer. Specifically, about 2 mol. % to about 28 mol. % transition metal oxide, more specifically about 8 mol. % to about 24 mol. %, with about 16 mol. % to about 20 mol. %. For example the solid solution for the base adsorber layer can be a single transition metal oxide in the solid solution (e.g., $WO_{0.19}Zr_{0.81}O_2$), or a combination of transition metal oxides in the solid solution (e.g., $Ni_{0.04}Mo_{0.12}Zr_{0.84}$)

In the base adsorber layer, the base adsorber precious metal component can be employed at about 0.05 wt % to about 4 wt %, based on the total weight of the base adsorbing layer. Specifically, about 0.01 wt % to about 6 wt % of the precious metal component can be employed, more specifically about 0.5 wt % to about 4 wt % precious metal component, and even more specifically about 1 wt % to about 2 wt % precious metal component.

Due to the high carbon monoxide (CO) content introduced by the upstream reformer, ruthenium/zirconium catalysts are preferred in the base adsorber layer. When the precious metal component comprises ruthenium in combination with a second precious metal component, it is preferred that the moles of the second precious metal (based upon the total amount of precious metal in the base absorber layer), is less than the amount of ruthenium. The addition of ruthenium depresses activity but improves the durability of the catalyst because of its ability to prevent poisoning. The base adsorber precious metal component can comprise, for example, less than or equal to about 98 mol. % ruthenium and less than or equal to about 70 mol. % platinum, based on the total moles of precious metal in the base adsorber layer. Specifically, about 40 mol. % to about 98 mol. % ruthenium can be present, more specifically, about 50 mol. % to about 93 mol. % ruthenium, and even more specifically, about 60 mol. % to about 90 mol. % ruthenium. The precious metal in the base adsorber layer can comprise about 10 mol. % to about 50 mol. % platinum, specifically about 20 mol. % to about 40 mol. % platinum. For example, the base absorber layer can be $Ru_{0.70}Pt_{0.30}/W_{0.19}Zr_{0.81}O_2+Al_2O_3$.

Downstream of the NOx adsorber can optionally be a low temperature oxidation catalyst. Any residual exhaust species such as carbon monoxide, ammonia and hydrogen sulfide are oxidized to carbon dioxide ($CO_2$), nitrogen dioxide ($NO_2$) and sulfur dioxide ($SO_2$). Carbon dioxide and sulfur dioxide are acceptable to exhaust to the atmosphere. Oxidation catalyst can comprise the same catalyst materials, supports and substrates as set forth for the oxidation catalyst described above, wherein the catalysts for each oxidation catalyst are chosen independently. Where the catalytic metal component is a combination of platinum with one or more other metals, the other metals, e.g., palladium, and the like, are typically present in an amount less than the platinum. For example, this catalyst can comprise a platinum-palladium combination, the catalytic metal component can comprise less than or equal to about 95 at % platinum and less than or equal to about 50 at % palladium; with about 50 at % to about 75 at % platinum and about 50 at % to about 25 at % palladium preferred; and about 60 at % to about 70 at % platinum and about 40 at % to about 30 at % palladium especially preferred, based on the total atoms of the precious metal.

Standard hydrogen sensors can be used to control the system. For example, the exhaust is standard lean condition for 60 seconds, and then a 4 second hydrogen rich pulse is added, then the exhaust is standard lean condition for another 60 seconds. The reformer can be controlled in a manner such that if no hydrogen/ammonia breakthrough is detected, a 4 second reforming pulse can be increased to a longer duration such as a 5 second reforming pulse. If hydrogen/ammonia is detected, the about 4 second reforming pulse can be decreased to a shorter duration such as 3 seconds.

Preferably temperature sensors are also used to control the system. The temperature of the "$NO_x$" adsorber bed should not be out of the 300° C. to 500° C. range. Catalyst temperatures below 300° C. decrease $N_2$ yield and temperatures above 500° C. decrease $N_2$ yield. For example, if the temperature of the catalyst bed exceeded about 500° C. during the last pulse, then the amount of thermal energy generated in the reformer is decreased. If the temperature of the catalyst bed was less than about 300° C. during the last pulse, then the amount of thermal energy generated in the reformer is increased.

Although the particulate trap is regenerated at a high temperature e.g. about 700° C. to about 950° C. or greater, the $NO_x$ adsorber (e.g., located only a few inches downstream of the particulate trap), only reduces less than about 15 wt % of the $NO_x$ (based upon the total amount of the NOx in the stream) when $NO_x$ adsorber temperatures are greater than about 500° C. Efficient thermal management is needed for both particulates and NOx. To attain the desired thermal management, the thermal mass of the particulate trap is preferably sufficient to adsorb the thermal energy.

Nitrogen oxides in lean exhaust gas are minimized with incorporation of a $NO_x$ adsorber located after the particulate trap. A $NO_x$ adsorber promotes catalytic oxidation of nitrogen sub-oxides to nitrogen dioxide. The formation of nitrogen dioxide is generally followed by the formation of a nitrate adsorbed on an acid adsorbing material. The $NO_x$ is thus "trapped".

NOx reduction activity is very temperature sensitive. $NO_x$ adsorbers rapidly and permanently deactivate at temperatures above 700° C. Efficient $NO_x$ reduction occurs in a narrow temperature range. For example, at 600° C. only 20% of the stored $NO_x$ is reduced, while at 400° C. about 80% of the stored $NO_x$ is reduced. Reactions of reducing agents on the $NO_x$ trap are exothermic. If the exhaust stream is at about 400° C. and a pulse of thermal energy and hydrogen is added, the $NO_x$ adsorbers may exceed 600° C. and have $NO_x$ reduction activity below 15%.

Supplemental thermal energy and reducing agent piped directly to the $NO_x$ trap are preferably introduced in a small volume over a long time period such that the $NO_x$ trap does not heat to greater than or equal to about 500° C. However, lowering the concentration of reducing agent to slightly below the stoichiometric point about 14.7 (e.g., to about 14.2), lowers the $NO_x$ reduction activity to about 15% even when the temperature is about 400° C. For efficient NOx reduction, e.g., greater than or equal to about 80%, the air/fuel ratio in the exhaust is significantly below the stoichiometric point, (e.g., preferably less than or equal to about 13.0, more preferably less than or equal to about 12), and at temperatures of less than or equal to about 500° C.

The combustion of injected fuel or other hydrocarbon generates significant thermal energy. The use of fuel or other hydrocarbon for chemical reduction on the $NO_x$ adsorber generates low $NO_x$ activity due to undesirable high $NO_x$ adsorber temperatures. The use of hydrogen for $NO_x$ reduction generates relatively little thermal energy. Carbon monoxide contained with the hydrogen cannot combust in the presence of the hydrogen so little thermal energy is generated due to the $NO_x$ adsorber. Advantageously, the carbon monoxide not consumed on the $NO_x$ adsorber, is consumed downstream on the oxidation catalyst. The carbon monoxide generates the temperature necessary for efficient combustion of the residual exhaust contaminants. Thus the use of hydrogen and carbon monoxide for chemical reduction on the $NO_x$ adsorber is highly desired. However, while the use of hydrogen as the $NO_x$ adsorber reducing agent is ideal, the formation of the hydrogen and carbon monoxide from fuel generates significant thermal energy. The generated thermal energy greatly reduces the effectiveness of the hydrogen for $NO_x$ reduction.

Sensors can be used in the system to detect temperature and breakthrough of hydrogen after the $NO_x$ adsorber. Excessive reducing agent and thus excessive thermal heat on the $NO_x$ adsorber is thereby avoided. Further, adjusting the flow rate of oxygen, fuel and exhaust in a combination that allows less exothermic combustion to occur can decrease the amount of thermal energy generated.

A fuel reformer produces thermal energy, hydrogen, carbon monoxide and other "light" hydrocarbon products. Preferably the thermal energy, hydrogen, carbon monoxide and light hydrocarbon products are introduced in a pulse upstream of the particulate trap in enough quantity to consume the excess oxygen and lower the air/fuel (a/f) ratio in the exhaust. The a/f ratio can be lowered from greater than or equal to 14.7 (e.g., about 19 to about 35) to less than or equal to about 13.0, e.g., to about 11.5 to about 12.5. A large amount of the thermal energy is transferred to the particulates and particulate trap. The particulate substrate preferably has excellent thermal conductivity such as silicon carbide or metal. The trapped materials are volatized or heated to a very reactive state with little consumption of the hydrogen and the carbon monoxide. For example, particulate materials such as sulfurous, nitrous and phosphorus compounds are reduced and vaporized as gaseous sulfur dioxide, nitrogen dioxide and phosphorus oxide. When the reformer stream is turned off, the exhaust stream rapidly returns to a state containing excess oxygen (e.g., and a/f ratio of about 14.7). The heated particulates exposed to excess oxygen are rapidly combusted. For example, particulate materials such as carbon and dehydrogenated hydrocarbons are oxidized and vaporized as carbon dioxide and water. The particulate trap is thereby regenerated.

A process for sequentially regenerating a particulate filter and $NO_x$ adsorber comprises periodically supplying a fuel to the reformer; converting the fuel to a reformate (i.e., hydrogen and carbon monoxide containing fluid) at a temperature of greater than or equal to 800° C.; selectively mixing the reformate with exhaust gas upstream of a particulate trap, feeding the exhaust gas, hydrogen and carbon monoxide containing fluid into the particulate trap at a temperature of greater than or equal to 600° C., feeding the particulate trap effluent into a $NO_x$ adsorber at a temperature of less than or equal to 450° C., optionally after the particulate trap effluent has passed through a phosphate trap, and then feeding the NOx adsorber effluent to an oxidation catalyst at a temperature greater than or equal to 200° C.

Referring now to FIG. 1, a system, generally designated 10, for regenerating a non-catalyzed particulate filter and a $NO_x$ adsorber is shown. System 8 depicts a preferred architecture for lean burn vehicles such as but not limited to diesel engines. The system 8 generally comprises a fuel source 12 in fluid communication with an inlet 14 of a reformer 16. An outlet 18 of the reformer 16 is fluidly connected to a reformer through valve 20 disposed to selectively provide fluid communication from the reformer 16 to an exhaust conduit 22. Disposed in serial fluid communication within the exhaust conduit 22 are an oxidation catalyst 24, particulate trap 26, phosphate trap 28, $NO_x$ adsorber 30, and oxidation catalyst 32. Valve 20 provides controlled fluid communication from the reformer 16 to the particulate trap 26. The general directional flow of exhaust fluid from an engine 10 is through exhaust conduit 22, the oxidation catalyst 24, the particulate trap 26, the phosphate trap 28, the $NO_x$ adsorber 30 and the oxidation catalyst 32. The fluid passing through the exhaust conduit 28 is then discharged as treated exhaust 34 into the external environment.

In operation of system 6, the reformer 16 converts the fuel from the fuel source 12 to thermal energy, hydrogen and carbon monoxide. The thermal energy is transferred to the exhaust components such as the particulate trap and $NO_x$ adsorber. If there is enough thermal energy and hydrogen and carbon monoxide, effective denitrofication of a particulate trap 26 and $NO_x$ adsorber 30, and desulfurisation of oxidation catalyst 24, particulate trap 26, phosphate trap 28, and $NO_x$ adsorber 30, can be achieved. For example, in system 8, when valve 20 is open, thermal energy, hydrogen, and carbon monoxide, from the reformer 16 can be fed directly to the exhaust fluid stream, mixing with exhaust then entering the particulate trap 26.

Thermal energy transferred to particulate trap 26 allows vaporization of soluble organic fraction and sulfurous aerosols, and increases the reactivity of the remaining material. High temperature hydrogen and carbon monoxide effectively "crack" the remaining heavy organics, polymerized carbons, polymerized sulfates, and polymerized phosphates into smaller volatile compounds. The smaller volatile compounds can be adsorbed upon and catalyzed by the $NO_x$ adsorber 30 and oxidation catalyst 32. High temperature and hydrogen can volatize the engine oil poisons or "glazes" such as zinc calcium phosphate. The volatile glazes, e.g. zinc calcium phosphate materials, can be irreversibly adsorbed on the phosphate trap 28.

After the thermal energy, high temperature hydrogen and carbon monoxide pulse, rapid return to oxidizing conditions allows oxidation of the carbon remaining on the particulate trap 26, adsorbtion of the zinc calcium phosphate on the phosphate trap 28, storage of $NO_x$ and $SO_x$ on the $NO_x$ adsorber 30, and oxidation of the small volatile organics, hydrogen, carbon monoxide, ammonia, hydrogen sulfide and carbon sulfides on oxidation catalyst 32.

The high concentration pulse of high temperature hydrogen chemically reduces sulfur species contained on the particulate trap 26, phosphate trap 28, and NOx adsorber 30. All sulfur species are reduced and released as hydrogen sulfide. The described components of the $NO_x$ adsorber 30 are such that the entire pulse of hydrogen can be adsorbed without slippage to oxidation catalyst 32. No hydrogen will reach the oxidation catalyst 32. In one embodiment, the described components of the oxidation catalyst 32 are such that the entire pulse of hydrogen sulfide can be adsorbed without slippage to treated exhaust 34. All sulfur species released as hydrogen sulfide are rapidly adsorbed on oxidation catalyst 32. After the thermal energy and high temperature hydrogen pulse has passed, rapid return to oxidizing conditions forces rapid oxidation of the hydrogen sulfide adsorbed on oxidation catalyst 32.

Preferably reformer 16 and valve 20 are located after the oxidation catalyst 24. Thus the hydrogen and carbon monoxide will not be oxidized prematurely. Preferably, the exhaust fluid as it enters the oxidation catalyst 24 is at all times at a temperature of about 300° C. to about 500° C.

Reformer 16 and valve 20 can be programmed to provide intermittent flow of thermal energy, high temperature hydrogen, and high temperature carbon monoxide. Preferably, there is a trapping phase of about 60 seconds (e.g., about 30 seconds to about 2 minutes). Reformer 16 is inactive and valve 20 closed during the trapping phase. Preferably, there is release phase of about 4 seconds (e.g., about 2 seconds to about 6 seconds). Reformer 16 is active and valve 20 open during the release phase. Preferably, there is a cool down phase of about 8 seconds (e.g., about 5 seconds to about 12 seconds). Reformer 16 is inactive and valve 20 closed during the cool down phase.

Preferably, during the trapping phase, the exhaust fluid as it enters the particulate trap 26 is at a temperature of about 300° C. to about 500° C. Desirably, during the release phase, the exhaust fluid, as it enters the particulate trap 26, is at a temperature of about 700° C. to about 1,000° C., and during the cool down phase, the particulate trap 26 is at a temperature of about 700° C. to about 1,000° C., cooling down to a temperature of about 300° C. to about 500° C.

During the trapping phase, the exhaust fluid, as it enters the phosphate trap 28, can be at a temperature of about 300° C. to about 500° C.; during the release phase, the exhaust fluid, as it enters the phosphate trap 28, can be at a temperature of about 500° C. to about 700° C.; and during the cool down phase, the phosphate trap 28 can be at a temperature of about 400° C. to about 700° C., cooling down to a temperature of about 300° C. to about 500° C.

With respect to the NOx adsorber, during the trapping phase, the exhaust fluid, as it enters the $NO_x$ adsorber 30, can be at a temperature of about 300° C. to about 500° C.; during the release phase, the exhaust fluid, as it enters the $NO_x$ adsorber 30, can be at a temperature of about 300° C. to about 600° C.; and during the cool down phase, the $NO_x$ adsorber 30 can be at a temperature of about 300° C. to about 600° C., cooling down to a temperature of about 300° C. to about 500° C.

During the trapping phase, the exhaust fluid, as it enters the oxidation catalyst 32, can be at a temperature of about 300° C. to about 500° C.; during the release phase, the exhaust fluid, as it enters the oxidation catalyst 32, can be at a temperature of about 300° C. to about 500° C.; and during the cool down phase, the oxidation catalyst 32 can be at a temperature of about 300° C. to about 500° C., and remains at a temperature of about 300° C. to about 500° C.

Figure 2:
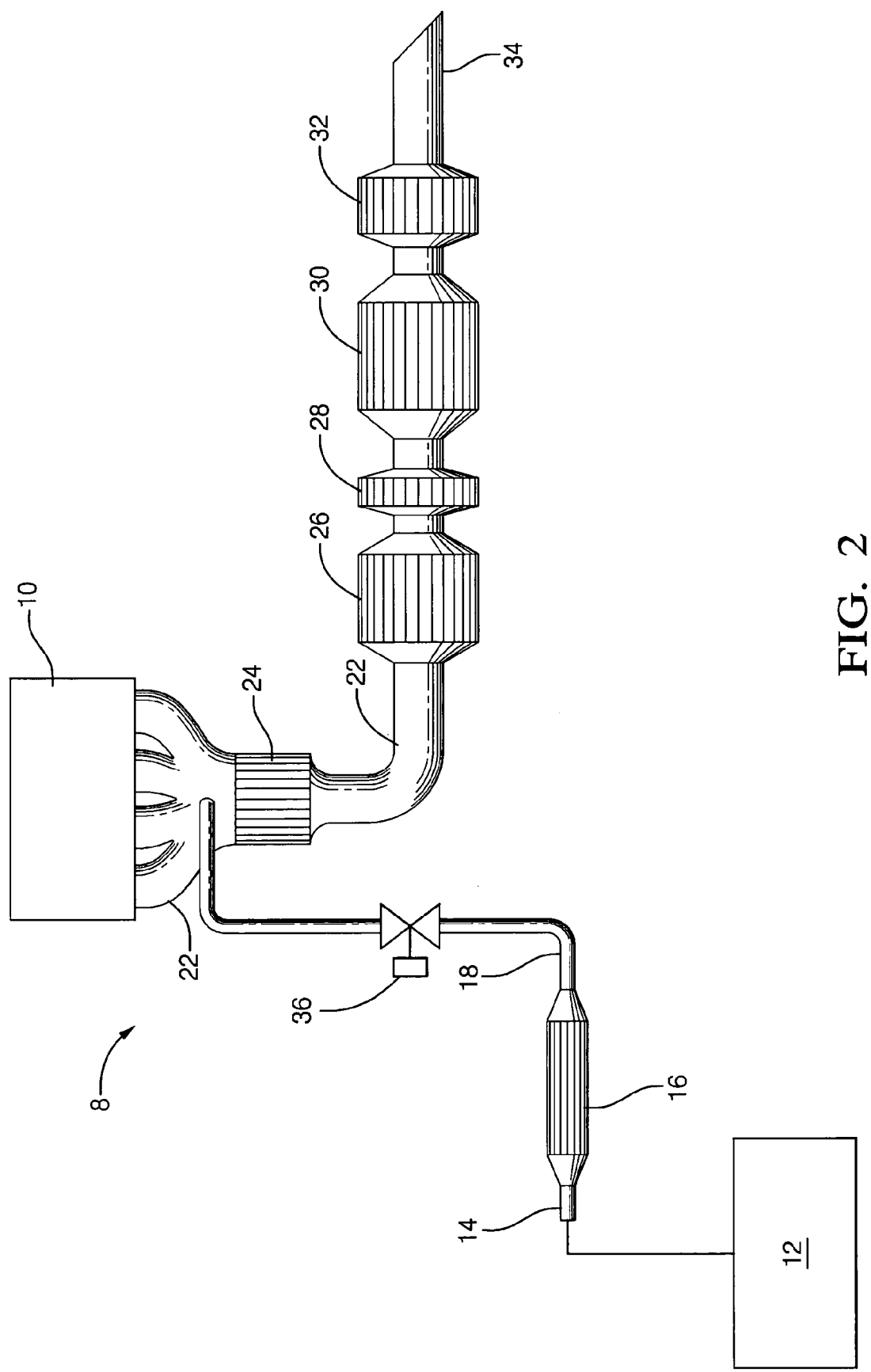
FIG. 2 is a schematic view of a system for regenerating a first oxidation catalyst, a particulate trap, a NOx adsorber and a second oxidation catalyst of a lean burn vehicle.

In addition or in the alternative to the design illustrated in FIG. 1, reformer 16 and valve 36 may be located to introduce reformate (e.g., hydrogen, carbon monoxide, and thermal energy), into the exhaust conduit 22 upstream of the oxidation catalyst 24 as shown in system 8 of FIG. 2. Thus the hydrogen and carbon monoxide can periodically release the sulfur, nitrogen, phosphate, zinc and calcium poisons that tend to deactivate diesel oxidation catalysts (DOC). In this embodiment, the exhaust fluid, as it enters the oxidation catalyst 24, can be, at all times, at a temperature of about 300° C. to about 500° C.

Optionally, reformer 16 may be connected to the exhaust conduit 22 via valve 36, and an additional valve (as illustrated in FIG. 1) such that reformate may be introduced both upstream and downstream of the oxidation catalyst 24. Thus the hydrogen and carbon monoxide can periodically release the sulfur, nitrogen, phosphate, zinc and calcium poisons that tend to deactivate oxidation catalysts 24 and 32, particulate trap 26, phosphate trap 28, and $NO_x$ adsorber 30.

The hydrogen and carbon monoxide can also be used to regenerate ceramic materials added to the fuel. For example, the fuel source 12 might contain a combustion aid such as cerium oxylate. During combustion lean burn engine 10 would form particulate cerium oxide. Cerium oxide in the combustion chamber greatly reduces engine out particulate mass. The particulate cerium oxide would collect with other particulates on particulate trap 26. Cerium oxide significantly reduces the temperature necessary for particulate trap regeneration. Hydrogen from the reformer directed through a cerium oxide containing particulate trap drives off the poisons accumulated on the cerium oxide (regenerating the cerium oxide (i.e., the fuel additive)). "Refreshed" cerium oxide becomes active again for low temperature oxidation of particulates. Preferably, about 4 ppm to about 12 ppm, based upon weight, of the fuel additive is deposited on the particulate filter.

Reformer 16 and valve(s) 20/36 can be in electrical communication with an on-board computer. The computer can be programmed such that the duration of thermal energy, hydrogen, and carbon monoxide pulse can be increased or decreased as needed. For example, in system 6, FIG. 1, the computer can be programmed to start the reformer 16 and open valve 20 based upon operating conditions such as idle speed or load, exhaust temperature, and/or pressure differential across the diesel particulate filter 26. Alternatively, the computer can be programmed to start the reformer 16 and open valve 20 based upon a time-based program.

One skilled in the art will appreciate that embodiments of the above mentioned systems could be used for processes that include regeneration of oxidation catalysts 24 and 32, particulate trap 26, phosphate trap 28, and NOx adsorber 30. Additionally, it is appreciated that embodiments of the above mentioned systems can be used for processes that include minimization of exhaust emissions 34 using a combination of components such as fuel source 12, reformer 16, valve(s) 20/36, exhaust conduit 22, oxidation catalysts 24 and 32, particulate trap 26, phosphate trap 28, and/or NOx adsorber 30.

Advantageously, the system provides on-demand regeneration capabilities for the oxidation catalyst, the $NO_x$ adsorber, and the particulate filter. Additional chemicals do not have to be carried on-board, since reformer 16 can readily produce hydrogen and carbon monoxide, for use as reluctant as needed. Further, the use of hydrogen and carbon monoxide also increases $NO_x$ performance at lower temperatures as well as particulate filter regeneration at lower exhaust temperatures. Another hydrogen advantage is an increase in fuel efficiency when compared to hydrocarbon-injected reduction of $NO_x$ adsorbers. Yet another advantage may be reducing platinum and rhodium loading of the oxidation catalysts and $NO_x$ adsorbers, which may lead to substantial cost savings.

The present system accomplishes both (i) the generation of thermal energy, hydrogen, and carbon monoxide, and (ii) separation of the thermal energy away from the hydrogen and carbon monoxide. The present method also addresses the issues of glass materials deposited on the particulate trap. Glass materials are not stable in hydrogen and water at high temperature. The addition of thermal energy, hydrogen, and water, rapidly vaporizes the glass materials off the particulate trap. Other methods, such as addition of thermal energy, hydrocarbons, and water, have no effect on glass materials.

The combination of thermal energy and hydrogen vaporizes "glass" off particulate traps and enables long-term particulate trap regeneration.

The addition of thermal energy (such as occurs with auxiliary devices, e.g., burners, heating elements, or microwaves) is effective for regeneration of particulate traps. For example, an air-fuel nozzle and an ignition device can be used and operated, when desired, to heat the exhaust gases and the diesel particulate filter to the combustion temperature of the collected particulate matter. In this manner, the collected particulate matter is burned from the filter surfaces to permit normal flow of the exhaust gases. However, on cold passenger cars, a fuel penalty of about 7% to about 10% is needed to generate the necessary amount of thermal energy. Further, the addition of thermal energy in an oxidizing environment vaporizes organosulfur compounds allowing passage through the particulate trap. However, downstream the organosulfates condense in the NOx adsorber as nano-phase particulates. Additionally, supplemental heating does nothing to reduce $NO_x$ emissions. Thus significant power is consumed without acceptable emissions resulting.

The disclosed system provides simultaneous thermal energy and a strongly reducing environment. The thermal energy vaporizes the sulfur compounds and the hydrogen environment prevents condensation of those materials as nano-phase particulates. Only hydrogen is a strong enough reducing agent to prevent the nano-phase sulfur aerosol from forming. The disadvantages of other systems are thereby removed. Additionally, a fuel penalty of only about 2% to about 7% achieve acceptable particulate and $NO_x$ emissions. Additionally, proper sizing of the particulate trap and control of the thermal energy input eliminates the need for heat exchange devices.

The adaptive thermal management system disclosed herein can be for regenerating an oxidation catalyst, a particulate filter, a $NO_x$ adsorber, and a second oxidation catalyst. The system can eliminate reformer carbon deposits through the coupling of the reformer and exhaust manifold together. The system can use sensors and computer controls such that the exhaust temperature is high enough at the particulate trap to vaporize particulate mass and low enough at the $NO_x$ adsorber and second oxidation catalyst for effective $NO_x$ and $SO_x$ reduction.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An exhaust system, comprising:
    an acid/base NOx adsorber;
    a reformer physically integrated with an exhaust manifold and disposed upstream of the adsorber and in fluid communication with a fuel source, wherein the reformer is designed to generate a fluid comprising thermal energy, hydrogen, and carbon monoxide;
    a first valve for controlling the introduction of the fluid to an exhaust conduit; and a particulate filter disposed upstream and in fluid communication with the NOx adsorber and downstream and in fluid communication with the reformer such that the first valve controls introduction of fluid to the exhaust conduit upstream of the particulate filter.

2. The system of claim 1, wherein said reformer is a partial oxidation reformer designed to generate the thermal energy such that, when the fluid is combined with a gas stream in the exhaust conduit to form a heated stream, the heated stream has a temperature of about 600° C. to about 1,000° C.

3. The system of claim 1, wherein the NOx adsorber comprises a substrate with an acid adsorber underlayer disposed beneath a base adsorber overlayer.

4. The system of claim 3, wherein the acid adsorber underlayer comprises:
an acid adsorber zirconium component in solid solution with at least one of an alkali element component and an alkaline earth metal component; and
an acid adsorber precious metal component.

5. The system of claim 4, wherein the acid adsorber precious metal component comprises about 90 mol. % to about 99 mol. % platinum and about 1 mol. % to about 10 mol. % rhodium, based on the total moles of the acid adsorber precious metal component.

6. The system of claim 5, wherein the alkali element component and an alkaline earth metal component are selected from the group consisting of comprises barium, strontium, calcium, magnesium, cesium, rubidium, potassium, sodium, lithium, and a combination comprising one or more of the foregoing.

7. The system of claim 3, wherein the base adsorber overlayer comprises:
a base adsorber zirconium component in solid solution with an transition metal oxide component; and
a base adsorber precious metal component.

8. The system of claim 7, wherein the base adsorber precious metal component comprises about 10 mol. % to about 40 mol. % of platinum and about 60 mol. % to about 90 mol. % of ruthenium, based on the total moles of the base adsorber precious metal component.

9. The system of claim 8, wherein the transition metal oxide is selected from the group consisting of vanadium oxide, niobium oxide, molybdenum oxide, tungsten oxide, rhenium oxide, nickel oxide, and a combination of one or more of the foregoing transition metal oxides.

10. The system of claim 1, further comprising a first oxidation catalyst disposed upstream of the particulate filter and downstream of the reformer, and a second oxidation catalyst disposed downstream of the NOx adsorber.

11. The system of claim 10, wherein the first oxidation catalyst further comprises a first support and a first catalytic metal component and the second oxidation catalyst further comprises a second support and a second catalytic metal component,
wherein the first catalytic metal component comprises about 60 at % to about 90 at % platinum and about 10 at % to about 40 at % ruthenium, based upon the total weight of the first catalytic metal component;
wherein the second catalytic metal component comprises about 50 at % to about 75 at % platinum and about 50 at % to about 25 at % palladium, based upon the total weight of the second catalytic metal component; and
wherein the first support and the second support are, individually, selected from the group consisting of zirconium solid solutions, zirconium titanium oxides, titanium oxides, zirconium oxides, aluminum oxides, zirconium toughened aluminum oxide, titanium toughened aluminum oxide, and combinations comprising at least one of the foregoing supports.

12. The system of claim 11, wherein at least one of the first support and the second support is selected from the group consisting of zirconium titanium solid solution, zirconium titanium aluminum solid solution, and combinations comprising at least one of the foregoing supports.

13. The system of claim 11, further comprising a second valve for controlling the introduction of the fluid to the exhaust conduit upstream of the first oxidation catalyst, and wherein the first valve located to control fluid introduction to the exhaust conduit downstream of the first oxidation catalyst.

14. The system of claim 1, further comprising a computer for controlling the system.

15. The system of claim 1, wherein the reformer comprises a reformer substrate comprising a reformer support and a reformer catalyst;
wherein the reformer catalyst comprises about 70 at % to about 85 at % rhodium and about 2.5 at % to about 20 at % platinum based on the total weight of the reformer catalyst;
wherein the reformer support is selected from the group consisting of hexaalluminogallates, alluminogallates, hexaaluminates, aluminum oxidetes, zirconium toughened aluminum oxide, titanium toughened aluminum oxide, aluminum oxide, and combinations comprising at least one of the foregoing reformer supports; and
wherein the reformer substrate is selected from the group consisting of zirconium toughened aluminum oxide, titanium toughened aluminum oxide, aluminum oxide, zirconium oxide, titanium oxide, as well as oxides, alloys, cermets, and combinations comprising at least one of the foregoing reformer substrates.

16. The system of claim 1, wherein the reformer catalyst comprises about 70 at % to about 80 at % rhodium and about 5 at % to about 10 at % platinum.

17. The system of claim 15, wherein the reformer support is selected from the group consisting of hexaalluminogallates, alluminogallates, hexaaluminates, and combinations comprising at least one of the foregoing reformer supports.

18. The system of claim 1, wherein the particulate filter comprises a wall flow monolithic substrate comprising a filter substrate material selected from the group consisting of silicon carbide and stainless steel.

19. The system of claim 1, further comprising a phosphate trap disposed downstream of the particulate filter and upstream of the NOx adsorber, wherein the phosphate trap consists essentially of a trap material supported on a trap substrate, and wherein the trap material is selected from the group consisting of zeolites, high surface area aluminum oxide, zirconium toughened aluminum oxide, titanium toughened aluminum oxide, and aluminum oxide.

20. The system of claim 19, wherein the trap material is a zeolite.

21. A method for operating an exhaust system, comprising:
generating a gas stream comprising NOx and particulate;
passing the gas stream through a particulate filter and then through a NOx adsorber, wherein, during a storage phase, the particulate filter removes the particulate from the gas stream and the NOx adsorber adsorbs the NOx on an acid adsorber;
regenerating by:
generating a fluid comprising thermal energy, hydrogen, and carbon monoxide from a fuel;

introducing the fluid to a gas stream to form a heated stream having a temperature of about 600° C. to about 1,000° C.;

introducing the heated stream to the particulate filter;

regenerating the particulate filter;

reducing the temperature of the heated stream to form a particulate effluent having a temperature of less than or equal to about 500° C.;

introducing the particulate effluent to a NOx adsorber, wherein the hydrogen reacts with adsorbed NOx to form NHx;

adsorbing the NHx on a base adsorber in the NOx adsorber; and forming an adsorber effluent.

22. The method of claim 21, wherein the gas stream has an engine comprises an a/f ratio greater than or equal to 14.7.

23. The method of claim 22, wherein the a/f ratio is about 19 to about 35.

24. The method of claim 21, wherein the heated stream has an a/f ratio of less than or equal to about 13.

25. The method of claim 24, wherein the a/f ratio is about 11.5 to about 12.5.

26. The method of claim 21, further comprising:

introducing the heated fluid to a first oxidation catalyst before introducing the heated fluid to the particulate filter; and wherein the heated fluid has a temperature of about 600° C. to about 1,000° C.

27. The method of claim 21, wherein periods of time between regenerating are greater than or equal to 30 minutes, and wherein the regenerating is for a regeneration period of less than or equal to about 2 minutes.

28. The method of claim 21, wherein the heated stream has a temperature of greater than or equal to about 700° C. when it enters the particulate filter.

29. The method of claim 21, wherein the regenerating further comprises introducing the particulate effluent to a phosphate trap prior to introducing the particulate effluent to the NOx adsorber, and adsorbing vapor phase glass formers in the phosphate trap.

30. The method of claim 21, wherein the particulate effluent entering the NOx adsorber has a temperature of less than or equal to about 600° C.

31. The method of claim 21, wherein the temperature is about 300° C. to about 500° C.

32. The method of claim 21, further comprising reacting NOx in the gas stream with the NHx to form diatomic nitrogen.

33. The method of claim 21, further comprising oxidizing at least one species in the adsorber effluent in a second oxidation catalyst.

34. The method of claim 33, wherein the adsorber effluent entering the second oxidation catalyst has a temperature of about 200° C. to about 350° C.

35. The method of claim 21, further comprising selectively controlling introduction of the fluid to the gas stream upstream of a first oxidation catalyst and downstream of the first oxidation catalyst.

36. The method of claim 21, further comprising controlling a duration the storage phase, a duration the regenerating, an amount of the thermal energy generated, and an a/f of the heated stream.

37. The method of claim 21, further comprising depositing a fuel additive on the particulate filter.

38. The method of claim 37, wherein the fuel additive comprises cerium.

39. The method of claim 37, wherein the amount of fuel additive deposited on the particulate filter is about 4 ppm to about 12 ppm, based upon weight.

40. The method of claim 37, further comprising regenerating the fuel additive.

41. A method for operating an exhaust system, comprising:

generating a gas stream comprising NOx and particulates;

passing the gas stream through a particulate filter, then through a phosphate trap, and then through a NOx adsorber, wherein, during a storage phase, the particulate filter removes the particulates from the gas stream and the NOx adsorber adsorbs the NOx on an acid adsorber;

regenerating by:

generating a fluid comprising thermal energy, hydrogen, and carbon monoxide from a fuel;

introducing the fluid to a gas stream to form a heated stream having a temperature of about 700° C. to about 1,000° C.;

introducing the heated stream to a first oxidation catalyst;

introducing the heated stream to the particulate filter, wherein the heated stream has a temperature of greater than or equal to 700° C. when it enters the particulate filter;

regenerating the particulate filter;

reducing the temperature of the heated stream to form a particulate effluent having a temperature of less than or equal to about 700° C.;

introducing the particulate effluent to the phosphate trap;

adsorbing vapor phase glass formers in the phosphate trap to form a trap effluent;

introducing the trap effluent to the NOx adsorber, wherein the trap effluent has a temperature of about 300° C. to 500° C. when entering the NOx adsorber, and wherein the hydrogen reacts with adsorbed NOx to form NHx;

adsorbing the NHx on a base adsorber in the NOx adsorber and forming an adsorber effluent; and introducing the adsorber effluent to a second oxidation catalyst, wherein the adsorber effluent has a temperature of about 200° C. to about 350° C. when entering the second oxidation catalyst.

* * * * *